Sept. 21, 1954  C. NELSON  2,689,501
MEANS FOR TEACHING ARRANGEMENTS OF THE PIANO
Filed June 16, 1951
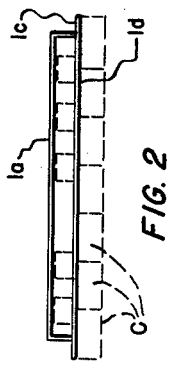
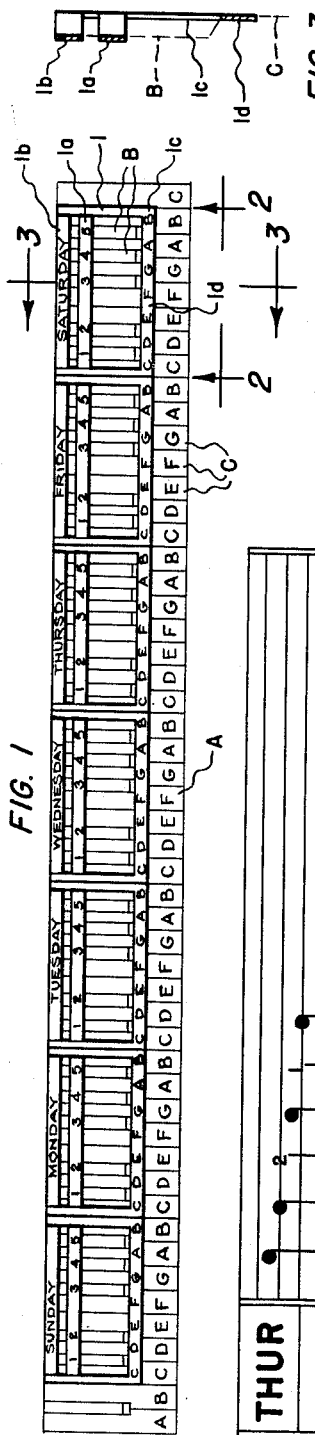
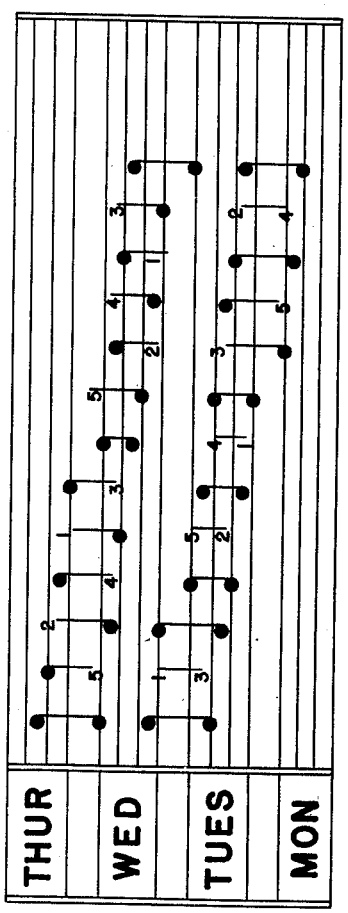
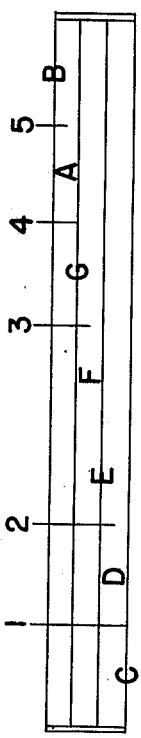
INVENTOR.
CHARLES NELSON
BY
Wm. H. Dean
AGENT Patented Sept. 21, 1954

2,689,501

UNITED STATES PATENT OFFICE 2,689,501

MEANS FOR TEACHING ARRANGEMENTS OF THE PIANO

Charles Nelson, San Diego, Calif.

Application June 16, 1951, Serial No. 231,997

2 Claims. (Cl. 84—478)

My invention relates to a means and methods for teaching arrangements of the piano and the objects of my invention are:

First, to provide a means and method of this class which greatly simplifies the teaching of arrangements of the piano.

Second, to provide a means of this class which may be readily positioned on a piano keyboard in order to identify the various positions thereon.

Third, to provide a means and method of this class which promotes the writing of music for the piano on a four line staff in place of the conventional five line staff.

Fourth, to provide a means of this class which provides a very simple indication of sharps and flats related to the various positions on the piano keyboard.

Fifth, to provide a means of this class which may be positioned on the conventional piano keyboard without altering the piano or permanently fixing the same thereon.

Sixth, to provide a means of this class which is readily installed on the piano and easy and quickly removed if desired.

Seventh, to provide a means and method of this class which will generally promote the introduction of simplified sheet music and which may be used by people who do not have a musical education and Eighth, to provide a means of this class which is very simple and economical of construction, efficient in operation and which will not readily deteriorate or get out of order.

With these and other objects as will appear hereinafter, my invention consists of certain novel features of construction, combination and arrangement of parts and portions and of certain method as will be hereinafter described in detail and particularly set forth in the appended claims. Reference being had to the accompanying drawings and to the characters of reference thereon forming a part of this application in which:

Fig. 1 is a top plan view of a piano keyboard showing several of the devices which comprise my means for teaching arrangements for the piano.

Fig. 2 is an enlarged elevational view of one of the devices taken from the line 2—2 of Fig. 1, Fig. 3 is an enlarged sectional view of one of the devices taken from the line 3—3 of Fig. 1.

Fig. 4 is an arrangement of the four line staff adapted to accompany my means for teaching arrangements on the piano.

Fig. 5 is a simple view of a four line staff indicating the relationship of the notes including sharps and flats covered by one of my devices, of which there are seven, illustrated in Fig. 1 of the drawings, designated as corresponding to the days of the week which identifies the various positions on the piano keyboard.

Similar characters of reference refer to similar parts and portions throughout the several views of the drawings.

The piano keyboard A, as illustrated in Fig. 1 of the drawings, is a conventional keyboard and positioned thereon are seven of my devices for identifying certain groups of keys in accordance with the days of the week, namely, Sunday, Monday, Tuesday, Wednesday, Thursday, Friday and Saturday. Each of these devices is provided with an outline frame I, having two elevated cross bars $Ia$ and $Ib$ adapted to be positioned over the conventional black kays B, and this outline frame I is provided with a base portion $Ic$ adapted to rest on the upper surfaces of the conventional white keys C of the piano keyboard and positioned on the cross bar $Ia$ are numerals, 1, 2, 3, 4, and 5 designating the black keys B while the third cross bar $Id$ is provided with designations C, D, E, F, G, A, B which identify the white keys C of the piano keyboard.

Referring to Figure 5 of the drawings, it will be seen that the device as shown in Figs. 1, 2 and 3 of the drawings promotes the writing of music on the piano on a very simple four line staff and the continuity of music throughout the various positions, Thursday, Wednesday, Tuesday and Monday as shown in Fig. 4 of the drawings is greatly simplified. This arrangement provides for specialized compositions for the piano which are simple to read and to understand so that the layman may be able to quickly master the playing of the piano. It will be noted that the sharps and flats are indicated by numerals as shown in Figs. 4 and 5 of the drawings, these numerals as hereinbefore described being disposed on the cross bar $Ia$ of each of the devices as shown in Fig. 1 of the drawings coinciding with the black keys of the piano which are played to produce the sharps and flats. The other notes of each position are shown in substantially the manner normal to conventional music.

Though I have shown and described a particular construction, combination and arrangement of parts and portions and a certain method, I do not wish to be limited to this particular construction, combination and arrangement nor to the particular method, but desire to include in the scope of my invention, the construction, combination and arrangement and the method substantially as set forth in the appended claims.

Having thus described my invention, what I claim as new and desire to secure by Letters Patent is:

1. In an identifying means for piano keyboards having conventional five black and seven white keys for each octave, an octave-spanning and horizontally disposed U-shaped frame having two free ends and a connecting bar, a pair of parallel cross bars having terminal portions secured to the free ends of the U-shaped frame and central portions disposed above the level of said U-shaped frame, said frame being dimensioned to rest on white keys of a piano keyboard with said cross bars overlying said black keys, identifying means on said cross bars, and said frame and said cross bars being narrow to avoid interference during fingering of the keyboard.

2. In an identifying means for piano keyboards having conventional black and white key arrangement, an octave-spanning U-shaped frame having two free ends and a connecting bar, cross bar structure secured to and between the free ends of the U-shaped frame, said cross bar structure having the major portion thereof disposed above the level of said U-shaped frame, said cross bar structure having indicia thereon for identifying the black keys and said connecting bar having indicia thereon for identifying the white keys, whereby the frame comprises a guide to the keys when disposed horizontally on a keyboard while allowing fingering of the keyboard with the guide in place.

References Cited in the file of this patent

UNITED STATES PATENTS

| Number | Name | Date |
| --- | --- | --- |
| 1,234,814 | Standridge | July 31, 1917 |
| 1,246,068 | Dinwiddie | Nov. 13, 1917 |
| 1,534,669 | Smith | Apr. 21, 1925 |
| 1,725,844 | Barnes | Aug. 27, 1929 |
| 1,758,254 | Hazen | May 13, 1930 |
| 1,833,204 | Buxton | Nov. 24, 1931 |
| 2,003,384 | Moore | June 4, 1935 |
| 2,280,593 | Maffie | Apr. 21, 1942 |

FOREIGN PATENTS

| Number | Country | Date |
| --- | --- | --- |
| 303,782 | Germany | Mar. 11, 1918 |